United States Patent
Spampinato et al.

(10) Patent No.: US 10,140,550 B2
(45) Date of Patent: Nov. 27, 2018

(54) CLUSTERING METHOD AND SYSTEM, CORRESPONDING APPARATUS AND COMPUTER PROGRAM PRODUCT

(71) Applicant: STMicroelectronics S.r.l., Agrate Brianza (IT)

(72) Inventors: Giuseppe Spampinato, Catania (IT); Arcangelo Ranieri Bruna, Giardini Naxos (IT); Viviana D'Alto, Cassina de' Pecchi (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 112 days.

(21) Appl. No.: 15/169,232

(22) Filed: May 31, 2016

(65) Prior Publication Data

US 2017/0169311 A1  Jun. 15, 2017

(30) Foreign Application Priority Data

Dec. 14, 2015  (IT) .................. 102015000082886

(51) Int. Cl.
*G06K 9/62* (2006.01)
*G06T 7/215* (2017.01)
(Continued)

(52) U.S. Cl.
CPC ........... *G06K 9/6218* (2013.01); *G06K 9/481* (2013.01); *G06K 9/6202* (2013.01); *G06K 9/623* (2013.01);
(Continued)

(58) Field of Classification Search
CPC ........... G06T 7/215; G06T 2207/20201; G06T 2207/30241; G06T 7/20–7/292;
(Continued)

(56) References Cited

U.S. PATENT DOCUMENTS

2006/0244866 A1* 11/2006 Kishida .............. G06K 9/00771
  348/699
2009/0316042 A1* 12/2009 Liang .................... H04N 19/56
  348/441

(Continued)

OTHER PUBLICATIONS

John Y. A. Wang et al., "Representing Moving Images with Layers", M.I.T Media Laboratory Perceptual Computing Section Technical Report No. 279, Appears in IEEE Transactions on Image Processing Special Issue: Image Sequence Compression, vol. 3, No. 5, Sep. 1994, pp. 1-13. (Year: 1994).*

(Continued)

*Primary Examiner* — Brian Werner
(74) *Attorney, Agent, or Firm* — Seed IP Law Group LLP

(57) ABSTRACT

Image processing circuitry processes image frames in a sequence of image frames, for example, to identify objects of interest. The processing includes filtering motion vectors associated with a current image frame, grouping the filtered motion vectors associated with the current image frame into a set of clusters associated with the current image frame, and selectively merging clusters in the set of clusters associated with the current image frame. At least one of the filtering, the grouping and the merging may be based on one or more clusters associated with one or more previous image frames in the sequence of image frames. Motion vectors included in merged clusters associated with a previous frame may be added to filtered motion vectors before grouping the motion vectors in the current frame.

38 Claims, 2 Drawing Sheets

(51) Int. Cl.
*G06T 7/277* (2017.01)
*G06K 9/48* (2006.01)
*G06T 7/20* (2017.01)

(52) U.S. Cl.
CPC ............ *G06T 7/2033* (2013.01); *G06T 7/215* (2017.01); *G06T 7/277* (2017.01); *G06T 2207/10016* (2013.01); *G06T 2207/20024* (2013.01)

(58) Field of Classification Search
CPC ...... H04N 19/56; H04N 19/51–19/583; G06K 9/6218–9/6224
See application file for complete search history.

(56) References Cited

U.S. PATENT DOCUMENTS

| | | |
|---|---|---|
| 2012/0308144 A1 | 12/2012 | Tokunaga et al. |
| 2014/0071286 A1 | 3/2014 | Bernal et al. |
| 2014/0294079 A1 | 10/2014 | Sendik |

OTHER PUBLICATIONS

Lu et al., "Learning dense optical-flow trajectory patterns for video object extraction," IEEE International Conference on Advanced Video & Signal-based Surveillance (AVSS), Aug. 2010.
Duncan et al., "On the detection of motion and the computation of optical flow," IEEE Trans. Pattern Analysis and Machine Intelligence, vol. 14, No. 3, Mar. 1992.
Caselles et al., "Snakes in movement," SIAM J. Numerical Analysis, vol. 33, 1996.
Beauchemin et al., "The computation of optical flow," ACM Computing Surveys, vol. 27, No. 3 pp. 433-467, 1995.
Aslani et al., "Optical Flow Based Moving Object Detection and Tracking for Traffic Surveillance", World Academy of Science, Engineering and Technology International Journal of Electrical, Robotics, Electronics and Communications Engineering, vol. 7, No. 9, 2013.
Yokoyama et al., "A Contour-Based Moving Object Detection and Tracking", Proceedings of the 14th International Conference on Computer Communications and Networks (ICCCN), 2005.
Dimitriou et al., "Motion-based segmentation of objects using overlapping temporal windows," *Image and Vision Computing* 31:593-602, 2013.
Italian Search Report and Written Opinion, dated Sep. 7, 2016, in corresponding Italian application No. 102015000082886, filed Dec. 14, 2015, 10 pages.
Niu et al., "Moving Object Segmentation in the H.264 Compressed Domain," in *Lecture Notes in Computer Science, Computer Vision—ACCV 2009*, Zha et al., (eds.), Springer, 2010, pp. 645-654.
Sabirin et al., "Moving Object Detection and Tracking Using a Spatio-Temporal Graph in H.264/AVC Bitstreams for Video Surveillance," *IEEE Transactions on Multimedia* 14(3):657-668, Jun. 2012.
Smith et al., "A Scene Segmenter; Visual Tracking of Moving Vehicles," *Engineering Applications of Artificial Intelligence* 7(2):191-204, 1994.

\* cited by examiner

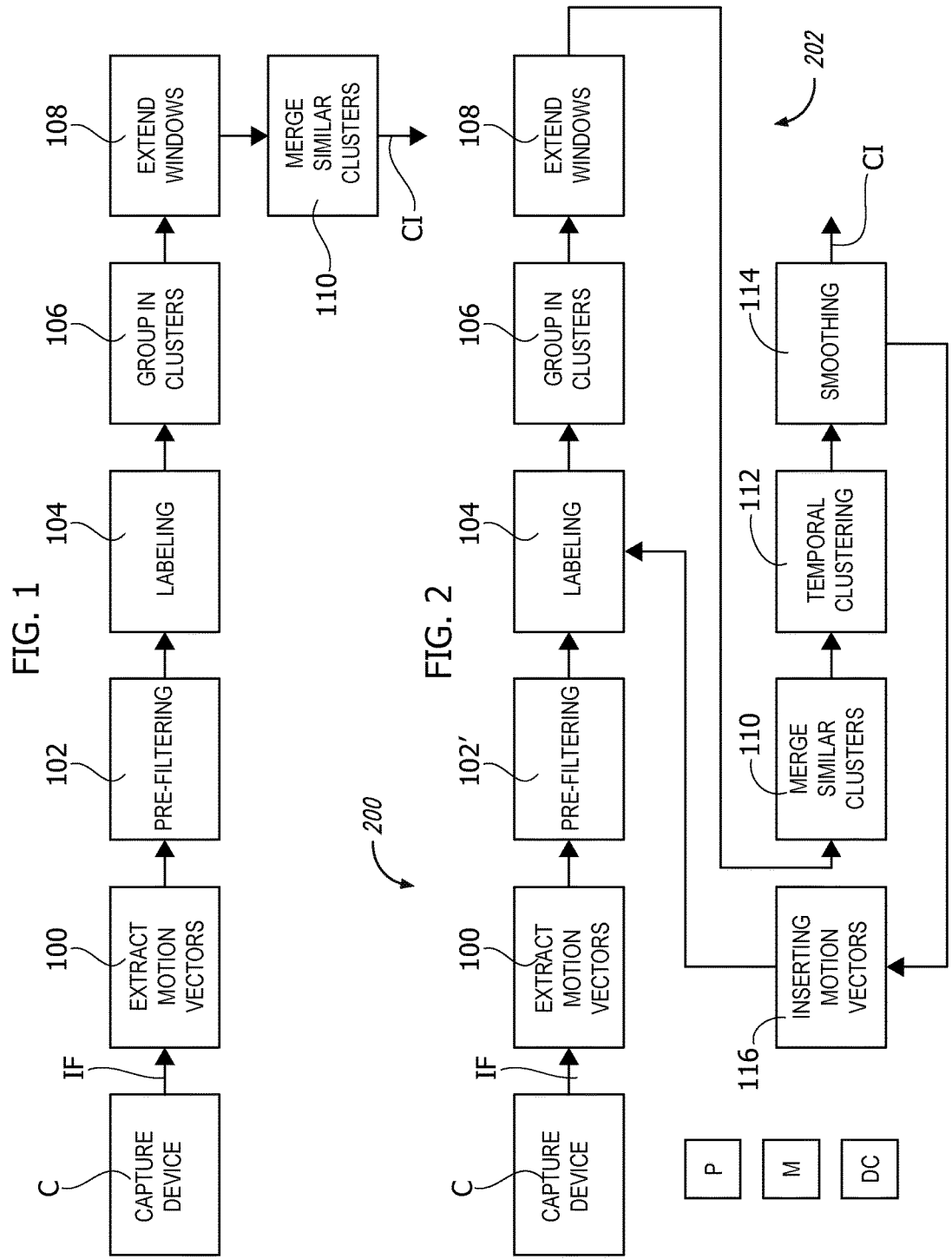

CLUSTERING METHOD AND SYSTEM, CORRESPONDING APPARATUS AND COMPUTER PROGRAM PRODUCT

BACKGROUND

Technical Field

The description relates to clustering techniques, such as techniques for retrieving clusters of moving objects in a scene acquired by an image sensor (image capture) device.

Description of the Related Art

Clustering is the task of grouping a set of (e.g., image) information in such a way that items of information in a same group (called a cluster) are more similar to each other than to those in other groups.

Detection and tracking of moving objects is a common task in computer vision applications, primarily as a low-level task to support other applications.

Efficiency in implementing this step may be desirable as it may appreciably affect performing subsequent processing steps.

BRIEF SUMMARY

In an embodiment, a method of clustering image information in a stream of input frames starting from motion vectors for said input frames includes: grouping said motion vectors into a set of clusters, applying merge clustering to said set of clusters by merging clusters from said set of clusters, wherein the method includes at least one of: applying to said motion vectors, prior to said grouping into a set of clusters, filtering to remove small motion vectors not included in previous clusters, supplementing said merge clustering with temporal clustering by removing from said set of clusters those clusters which are not in a previous frame in said stream of input frames and joining those clusters for a current frame referring to a same cluster for a previous frame in said stream of input frames, calculating a weighted average of homologous clusters for a current frame and a previous frame in said stream of input frames, and supplementing said motion vectors for grouping in said set of clusters for a current frame with vectors resulting from said merge clustering for a previous frame in said stream of input frames. In an embodiment, the method includes grouping said motion vectors into said set of clusters as a function of distance, module and angle difference between said motion vectors. In an embodiment, the method includes merging clusters from said set of clusters as a function of distance, module and angle difference between said clusters in said set of clusters. In an embodiment, applying to said motion vectors said filtering to remove small motion vectors not included in previous clusters includes one of: eliminating motion vectors having an absolute value not higher than a certain threshold; eliminating motion vectors other than those motion vectors lying around a cluster in a previous frame in said stream of input frames and having an orientation difference between the vector and said cluster in a previous frame in said stream of input frames less than a certain angle threshold; and eliminating motion vectors other than those motion vectors fulfilling condition above and other than those motion vectors that are at least a certain number N with a same orientation, in a certain frame window W×H. In an embodiment, said temporal clustering includes: obtaining a certain cluster relationship between frame clusters in a current frame and a previous frame in said stream of input frames, eliminating current frame clusters having no cluster relationship with a previous frame cluster, and merging previous and current frame clusters fulfilling said cluster relationship. In an embodiment, a current frame cluster and a previous frame cluster fulfill said relationship when having a distance and an orientation difference less than respective distance and orientation thresholds. In an embodiment, the method includes calculating a weighted average of homologous clusters for a current frame and a previous frame in said stream of input frames, wherein said homologous clusters fulfill said cluster relationship. In an embodiment, said grouping said motion vectors into a set of clusters includes grouping to a same cluster in said set of clusters vectors having a same label, by applying a same label to motion vectors v1 and v2 at positions p1 and p2, if: i) $SAD(p1,p2)<MPD$ and $SAD(v1,v2)<MVD$ wherein SAD denotes Sum of Absolute Difference and MPD and MVD denote respective thresholds and ii) said motion vectors v1 and v2 have an orientation difference less than certain angle threshold.

In an embodiment, a system for clustering image information conveyed by a stream of input frames starting from motion vectors for said input frames includes: clustering means for grouping said motion vectors into a set of clusters, merge clustering means for merging clusters from said set of clusters, wherein the system includes at least one of: i) a filter for applying to said motion vectors, prior to said grouping into a set of clusters, filtering to remove small motion vectors not included in previous clusters, ii) temporal clustering means for supplementing said merge clustering means with temporal clustering by removing from said set of clusters those clusters which are not in a previous frame in said stream of input frames and joining those clusters for a current frame which refer to a same cluster for a previous frame in said stream of input frames, iii) cluster smoothing means for calculating a weighted average of homologous clusters for a current frame and a previous frame in said stream of input frames, iv) said clustering means configured for supplementing said motion vectors for grouping in said set of clusters for a current frame with vectors resulting from said merge clustering for a previous frame in said stream of input frames, wherein the system is configured for operating according to an embodiment of a method disclosed herein. In an embodiment, the system comprises an image capture device to provide said stream of input frames.

One or more embodiments may relate to a corresponding system, corresponding apparatus (e.g., various types of image capture or sensor apparatus for use in fields of possible application as exemplified in the following) as well as to a computer program product loadable the memory of at least one computer and including software code portions for executing the steps of the method when the product is run on at least one computer. As used herein, reference to such a computer program product is understood as being equivalent to reference to a computer-readable means containing instructions for controlling the processing system in order to co-ordinate implementation of the method according to one or more embodiments. Reference to "at least one computer" is intended to highlight the possibility for one or more embodiments to be implemented in modular and/or distributed form.

One or more embodiments may use motion vectors between adjacent frames (obtained by means of any procedure for that purpose); starting from these motion vectors, a system according to one or more embodiments may be able to retrieve clusters of moving objects in a scene acquired by an image sensor device.

One or more embodiments may consider vectors with similar spatial and motion information as belonging to a same object.

In one or more embodiments, temporal information may also be used to improve performance.

Typical fields of application of one or more embodiments may include, e.g., apparatus for:
camera surveillance;
people/object detection/recognition;
CTA (Cross Traffic Alert);
people behavior analysis (e.g., anti-theft, falling detection, etc.);
unattended luggage detection.

One or more embodiments may facilitate providing one or more of the following advantages:
a reliable and low-cost clustering system may be provided by resorting to a simple technique with low power consumption and no additional memory requirements;
a flexible solution is provided suitable for use with a variety of procedures for estimating motion vectors between adjacent frames;
previous frame clustering and vector information may be exploited for a more robust clustering determination in a current frame;
current and previous related clusters may be averaged to maintain a more "graceful" clustering output for the user.

In an embodiment, a method comprises: processing, using image processing circuitry, motion vectors associated with a current image frame in a stream of image frames, the processing including: filtering the motion vectors associated with the current image frame; grouping the filtered motion vectors associated with the current image frame into a set of clusters associated with the current image frame; and selectively merging clusters in the set of clusters associated with the current image frame, wherein at least one of the filtering, the grouping and the merging is based on one or more clusters associated with one or more previous image frames in the stream of image frames. In an embodiment, the filtering the motion vectors associated with the current image frame comprises: comparing a magnitude of a motion vector associated with the current image frame to a threshold magnitude. In an embodiment, the method comprises: selectively removing the motion vector from the motion vectors associated with the current image frame based on the comparison and on whether the motion vector is included in at least one cluster associated with a previous image frame. In an embodiment, the method comprises removing the motion vector from the motion vectors associated with the current image frame when the magnitude is less than the threshold magnitude and the motion vector is not included in at least one cluster associated with the previous image frame. In an embodiment, the method comprising: retaining the motion vector in the motion vectors associated with the current image frame when the motion vector is within a threshold distance of a cluster associated with the previous image frame and an orientation difference between the motion vector and the cluster associated with the previous image frame is less than a threshold angle; retaining the motion vector in the motion vectors associated with the current image frame when the motion vector is one of a number of motion vectors greater than a threshold number of motion vectors within a defined window frame and which have a same orientation; retaining the motion vector in the motion vectors associated with the current image frame when the motion vector is included in at least one cluster associated with the previous image frame; and otherwise removing the motion vector from the motion vectors associated with the current image frame when the comparison indicates the magnitude is less than the threshold magnitude. In an embodiment, the method comprises: removing clusters from the set of clusters associated with the current image frame which are not included in a set of clusters associated with a previous image frame; and merging two or more clusters associated with the current image frame which refer to a same cluster associated with the previous image frame. In an embodiment, the method comprises: determining whether a relationship criteria is satisfied between a cluster associated with the current image frame and at least one cluster associated with a previous image frame; when it is determined that the relationship criteria is not satisfied for at least one cluster associated with the previous image frame, removing the cluster associated with the current image frame from the set of clusters associated with the current image frame; and when it is determined that the relationship criteria is satisfied for a cluster associated with the previous image frame, merging the cluster associated with the current image frame and the cluster associated with the previous image frame in the set of clusters associated with the current image frame. In an embodiment, the method comprises determining the relationship criteria is satisfied when: a distance between the cluster associated with the current image frame and a cluster associated with the previous image frame is less than a threshold distance; and a difference in orientation between the cluster associated with the current image frame and the cluster associated with the previous image frame is less than a threshold angle. In an embodiment, the method comprises: calculating a weighted average of homologous clusters for the current image frame and the previous image frame in said stream of input frames, wherein said homologous clusters fulfil satisfy the relationship criteria with each other. In an embodiment, the method comprises: calculating a weighted average of homologous clusters for the current image frame and a previous image frame in the stream of image frames. In an embodiment, the method comprises: adding motion vectors included in merged clusters associated with a previous frame to the filtered motion vectors before grouping the motion vectors in the current frame. In an embodiment, the grouping the filtered motion vectors is based on at least one of distance, magnitude and angle differences between said filtered motion vectors. In an embodiment, the merging clusters from said set of clusters is based on at least one of distance, magnitude and angle differences between said clusters in said set of clusters. In an embodiment, the method comprises: applying a same label to motion vectors v1 and v2 at positions p1 and p2, when:

i) SAD(p1,p2)<MPD and SAD(v1,v2)<MVD wherein SAD denotes Sum of Absolute Difference and MPD and MVD denote respective thresholds; and ii) said motion vectors v1 and v2 have an orientation difference less than a threshold angle; and grouping motion vectors having a same label into a cluster. In an embodiment, the method comprises identifying one more objects of interest in the image stream based on the merged clusters associated with the current image frame.

In an embodiment, a device comprises: one or more memories; and image processing circuitry coupled to the one or more memories, and which, in operation, filters motion vectors associated with a current image frame in a sequence of image frames; groups the filtered motion vectors associated with the current image frame into a set of clusters associated with the current image frame; and selectively merges clusters in the set of clusters associated with the current image frame, wherein at least one of the filtering, the grouping and the merging is based on one or more clusters associated with one or more previous image frames in the stream of image frames. In an embodiment, the filtering the motion vectors associated with the current image frame comprises: comparing a magnitude of a motion vector associated with the current image frame to a threshold magnitude. In an embodiment, the image processing circuitry, in operation, selectively removes the motion vector from the motion vectors associated with the current image frame based on the comparison and on whether the motion vector is included in at least one cluster associated with a previous image frame. In an embodiment, the image processing circuitry, in operation, removes the motion vector from the motion vectors associated with the current image frame when the magnitude is less than the threshold magnitude and the motion vector is not included in at least one cluster associated with the previous image frame. In an embodiment, the image processing circuitry, in operation: retains the motion vector in the motion vectors associated with the current image frame when the motion vector is within a threshold distance of a cluster associated with the previous image frame and an orientation difference between the motion vector and the cluster associated with the previous image frame is less than a threshold angle; retains the motion vector in the motion vectors associated with the current image frame when the motion vector is one of a number of motion vectors greater than a threshold number of motion vectors within a defined window frame and which have a same orientation; retains the motion vector in the motion vectors associated with the current image frame when the motion vector is included in at least one cluster associated with the previous image frame; and otherwise removes the motion vector from the motion vectors associated with the current image frame when the comparison indicates the magnitude is less than the threshold magnitude. In an embodiment, the image processing circuitry, in operation: removes clusters from the set of clusters associated with the current image frame which are not included in a set of clusters associated with a previous image frame; and merges two or more clusters associated with the current image frame which refer to a same cluster associated with the previous image frame. In an embodiment, the image processing circuitry, in operation: determines whether a relationship criteria is satisfied between a cluster associated with the current image frame and at least one cluster associated with a previous image frame; when it is determined that the relationship criteria is not satisfied for at least one cluster associated with the previous image frame, removes the cluster associated with the current image frame from the set of clusters associated with the current image frame; and when it is determined that the relationship criteria is satisfied for a cluster associated with the previous image frame, merges the cluster associated with the current image frame and the cluster associated with the previous image frame in the set of clusters associated with the current image frame. In an embodiment, the image processing circuitry determines the relationship criteria is satisfied when: a distance between the cluster associated with the current image frame and a cluster associated with the previous image frame is less than a threshold distance; and a difference in orientation between the cluster associated with the current image frame and the cluster associated with the previous image frame is less than a threshold angle. In an embodiment, the image processing circuitry, in operation: adds motion vectors included in merged clusters associated with a previous frame to the filtered motion vectors before grouping the motion vectors in the current image frame. In an embodiment, the image processing circuitry, in operation, identifies one more objects of interest in the image stream based on the merged clusters associated with the current image frame.

In an embodiment, a system comprises: an image capture device to capture a sequence of image frames; and image processing circuitry coupled to the image capture device, and which, in operation, filters motion vectors associated with a current image frame in the sequence of image frames; groups the filtered motion vectors associated with the current image frame into a set of clusters associated with the current image frame; and selectively merges clusters in the set of clusters associated with the current image frame, wherein at least one of the filtering, the grouping and the merging is based on one or more clusters associated with one or more previous image frames in the stream of image frames. In an embodiment, the filtering the motion vectors associated with the current image frame comprises: comparing a magnitude of a motion vector associated with the current image frame to a threshold magnitude; and selectively removing the motion vector from the motion vectors associated with the current image frame based on the comparison and on whether the motion vector is included in at least one cluster associated with a previous image frame. In an embodiment, the image processing circuitry, in operation: retains the motion vector in the motion vectors associated with the current image frame when the motion vector is within a threshold distance of a cluster associated with the previous image frame and an orientation difference between the motion vector and the cluster associated with the previous image frame is less than a threshold angle; retains the motion vector in the motion vectors associated with the current image frame when the motion vector is one of a number of motion vectors greater than a threshold number of motion vectors within a defined window frame and which have a same orientation; retains the motion vector in the motion vectors associated with the current image frame when the motion vector is included in at least one cluster associated with the previous image frame; and otherwise removes the motion vector from the motion vectors associated with the current image frame when the comparison indicates the magnitude is less than the threshold magnitude. In an embodiment, the image processing circuitry, in operation: removes clusters from the set of clusters associated with the current image frame which are not included in a set of clusters associated with a previous image frame; and merges two or more clusters associated with the current image frame which refer to a same cluster associated with the previous image frame. In an embodiment, the image processing circuitry, in operation: determines whether a relationship criteria is satisfied between a cluster associated with the current image frame and at least one cluster associated with a previous image frame; when it is determined that the relationship criteria is not satisfied for at least one cluster associated with the previous image frame, removes the cluster associated with the current image frame from the set of clusters associated with the current image frame; and when it is determined that the relationship criteria is satisfied for a cluster associated with the previous image frame, merges the cluster associated with the current image frame and the cluster associated with the previous image frame in the set of clusters associated with the current image frame. In an embodiment, the image processing circuitry, in operation: adds motion vectors included in merged clusters associated with a previous frame to the filtered motion vectors before grouping the motion vectors in the current image frame. In an embodiment, the image processing circuitry, in operation, identifies one more objects of interest in the image stream based on the merged clusters associated with the current image frame.

In an embodiment, a non-transitory computer-readable medium's contents configure image processing circuitry to identify objects of interests in an image sequence by performing a method, the method comprising: filtering motion vectors associated with a current image frame in the image sequence; grouping the filtered motion vectors associated with the current image frame into a set of clusters associated with the current image frame; and selectively merging clusters in the set of clusters associated with the current image frame, wherein at least one of the filtering, the grouping and the merging is based on one or more clusters associated with one or more previous image frames in the image sequence. In an embodiment, the filtering the motion vectors associated with the current image frame comprises: comparing a magnitude of a motion vector associated with the current image frame to a threshold magnitude; and selectively removing the motion vector from the motion vectors associated with the current image frame based on the comparison and on whether the motion vector is included in at least one cluster associated with a previous image frame. In an embodiment, the method comprises: removing clusters from the set of clusters associated with the current image frame which are not included in a set of clusters associated with a previous image frame; and merging two or more clusters associated with the current image frame which refer to a same cluster associated with the previous image frame. In an embodiment, the method comprises: determining whether a relationship criteria is satisfied between a cluster associated with the current image frame and at least one cluster associated with a previous image frame; when it is determined that the relationship criteria is not satisfied for at least one cluster associated with the previous image frame, removing the cluster associated with the current image frame from the set of clusters associated with the current image frame; and when it is determined that the relationship criteria is satisfied for a cluster associated with the previous image frame, merging the cluster associated with the current image frame and the cluster associated with the previous image frame in the set of clusters associated with the current image frame. In an embodiment, the method comprises: adding motion vectors included in merged clusters associated with a previous frame to the filtered motion vectors before grouping the motion vectors in the current image frame.

BRIEF DESCRIPTION OF THE SEVERAL VIEWS OF THE DRAWINGS

One or more embodiments will now be described, by way of example only, with reference to the annexed figures, wherein:

FIG. 1 is a functional block diagram of a method of clustering motion vectors,

FIG. 2 is a functional block diagram of an embodiment of a system to cluster motion vectors.

DETAILED DESCRIPTION

Figure 3:
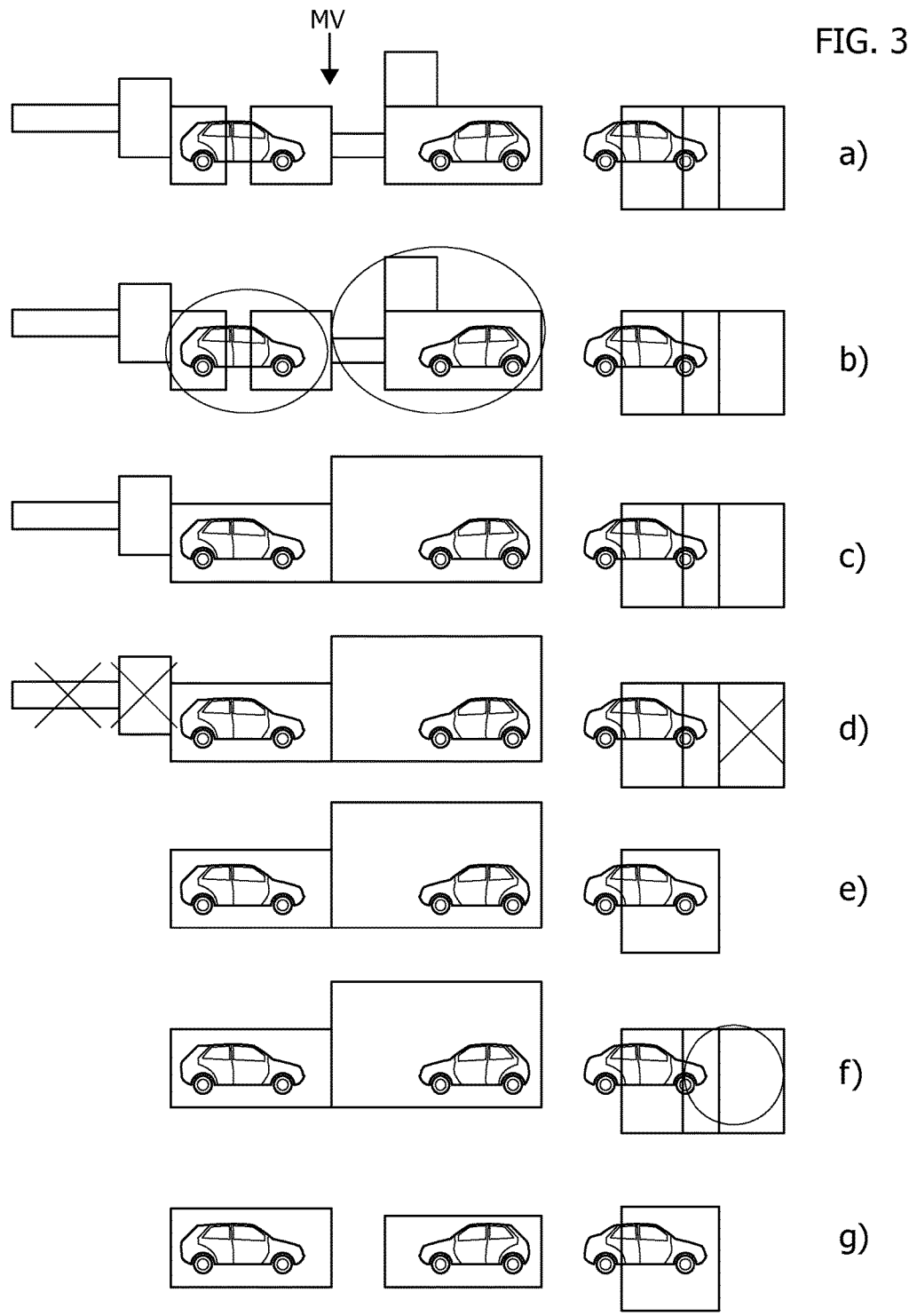
FIG. 3, is a schematic representation of possible operation of one or more embodiments.

In the ensuing description, one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

One or more embodiments may make use of motion vectors MV between adjacent frames (e.g., input frames IF in a video stream obtained by means of any means known for that purpose, e.g., a digital video camera C).

Starting from these vectors MV, one or embodiments may be able to retrieve clusters (see, e.g., clusters identified CI in FIGS. 1 and 2) of moving objects in a scene acquired by an image sensor device.

One or more embodiments may consider vectors with similar spatial and motion information as belonging to a same object. See, W.-C. Lu, Y.-C. F. Wang and C.-S. Chen, "Learning dense optical-flow trajectory patterns for video object extraction," IEEE International Conference on Advanced Video & Signal-based Surveillance (AVSS), August 2010. Optionally, temporal information is also used to improve performance.

As indicated, detection and tracking of moving objects is a common task in computer vision applications, primarily as a low-level task to support other applications. Efficiency in implementing this step may be desirable as it may appreciably affect performing subsequent processing steps.

Two types of approach may be adopted in order to fulfill this task: region-based and boundary-based.

Background subtraction and optical flow are common region-based approaches: these however are not particularly suited for real-time applications as they may require long times for estimating background models.

Various boundary-based approaches may use edge based optical flow. See, J. H. Duncan and T.-C. Chou, "On the detection of motion and the computation of optical flow," IEEE Trans. Pattern Analysis and Machine Intelligence, vol. 14, no. 3, March 1992; V. Caselles and B. Coll, "Snakes in movement," SIAM J. Numerical Analysis, vol. 33, 1996; S. S. Beauchemin and J. L. Barron, "The computation of optical flow," ACM Computing Surveys, 1995.

FIG. 1 is exemplary of a procedure as disclosed, e.g., in S. Aslani and H. Mandavi-Nasab, "Optical Flow Based Moving Object Detection and Tracking for Traffic Surveillance", World Academy of Science, Engineering and Technology International Journal of Electrical, Robotics, Electronics and Communications Engineering, Vol. 7, No. 9, 2013 and M. Yokoyama and T. Poggio, "A Contour-Based Moving Object Detection and Tracking", Proceedings of the 14th International Conference on Computer Communications and Networks (ICCCN), 2005.

It will be appreciated that some or all of the processing steps discussed in the instant exemplary detailed description may be performed in hardware, software, firmware, or a combination or subcombination of hardware, software, and firmware. For example, some or all of the above steps may be performed by a computing circuit, such as a microprocessor or microcontroller, that executes program instructions, or may be performed by a hardwired or firmware-configured circuit such as an ASIC or an FPGA.

In a step 100, starting from the input frames IF as provided by a (digital) image sensor or image capture device C (which may be of any known type for that purpose—e.g., a camera—and per se may be separate from embodiments) a list of motion vectors MV between adjacent frames may be provided (by known methods which do not require to be described in detail herein).

In a step 102, pre-filtering may be performed, e.g., in order to eliminate noise and/or spikes.

In a step 104 labelling may be performed (e.g., in a manner known per se) in order to insert a label for each "similar" motion vector.

In a clustering step 106 vectors with a same label may be grouped into clusters and in a further "N×M clustering" step 108 the clusters found may be extended to a larger N×M window.

In a merge clustering step 110 "similar" clusters may be merged to provide final identified clusters CI.

Such an approach may exhibit various drawbacks.

For instance, some of the steps considered in the foregoing may turn out to be computationally heavy insofar as they may operate on the image (that is the frame). This may be particularly the case for the pre-filtering step 102 if, e.g., median filter or background removal are used.

Also, no use is made of temporal cluster information in order to enhance clustering, e.g., with the previous clustering information used for tracking, and no "previous" vector information used.

FIG. 2 is a functional block diagram of a system 200 to cluster motion vectors. As illustrated, the system 200 includes a capture device C and image processing circuitry 202. One or more embodiments may adopt the clustering approach exemplified in FIG. 2, where parts or elements already introduced in connection with FIG. 1 are indicated with the same references. A corresponding detailed description will not be repeated here for the sake of brevity.

Again, some or all of the processing steps exemplified in FIG. 2 may be performed in hardware, software, firmware, or a combination or subcombination of hardware, software, and firmware. As illustrated, image processing circuitry 202 includes one or more processors or processing cores P, one or more memories M, and discrete circuitry DC, which may be used alone or in various combinations to implement the functionality of the image processing circuitry 202. For example, some or all of these steps may be performed by a computing circuit, such as a microprocessor or microcontroller, that executes program instructions, or may be performed by a hardwired or firmware-configured circuit such as an ASIC or an FPGA.

In one or more embodiments as exemplified in FIG. 2, the pre-filtering step 102 of FIG. 1 may be replaced by a pre-filtering step 102' wherein vectors, such as small vectors (e.g., really small vectors) which are not in the previous clusters, are eliminated.

In one or more embodiments as exemplified in FIG. 2, temporal clustering may be performed at 112 in association with merge clustering 110 (e.g., after merge clustering 110) in order to eliminate clusters which are not in a previous frame and join current clusters which refer to a same previous cluster.

In one or more embodiments as exemplified in FIG. 2, cluster smoothing may be performed at 114 (e.g., after merge and temporal clustering 110, 112) in order to produce, e.g., a weighted average of current and previous related clusters.

In one or more embodiments as exemplified in FIG. 2, some or all temporal vectors 116 contained in the current clusters, e.g., the clusters as available in cluster smoothing at 114 may be inserted (optionally applying a same movement, that is considering constant object speed) in the next frame, e.g., in the labelling step 104.

That is, in one or more embodiments, the motion vectors MV intended to be grouped (e.g., via labelling at 104) in the set of clusters (e.g., 106, 108, 110) for a current frame may be supplemented with the vectors 116 included in the clusters resulting from merge clustering 110 (and, optionally temporal clustering 112) for the previous frame.

In one or more embodiments as exemplified in FIG. 2, the various steps of labelling, clustering and merging may be carried out on vectors/clusters which are considered "similar" depending on distance, module and angle.

For instance, in one or more embodiments as exemplified in FIG. 2, the optical flow step 100 may generate input motion vectors MV which, after the steps of labelling 104 and clustering 106, 108 (e.g., with N=16, M=16) may identify a number of clusters as exemplified in portion a) of FIG. 3. These may then be subject to merge clustering 110 as schematically represented by ellipses in portion b) of FIG. 3 to obtain a number of resulting clusters (after merge clustering) in as schematically portrayed in portion c) of FIG. 3.

When applying temporal clustering 112, certain ones of these resulting clusters (e.g., three of them as indicated by cross marks in portion d) of FIG. 3) may be removed, because these clusters do not appear in previous frame clusters, so that only, e.g., three clusters remain as schematically portrayed in portion e) of FIG. 3.

When the temporal vectors 116 are applied to these clusters, e.g., two clusters may be extended (joined) and, e.g., another cluster may be introduced as schematically portrayed in portion f) of FIG. 3.

Applying cluster smoothing at 114 (possibly along with pre-processing at 102') may permit certain objects, e.g., three moving cars to be identified with the last identified cluster removed, this leading to the final result, namely the identified clusters CI as schematically portrayed in portion g) of FIG. 3.

As indicated, conventional pre-filtering as exemplified at 102 of FIG. 1 may remove motion vector noise by means of complex filtering such as, e.g., median filters. See, S. Aslani and H. Mandavi-Nasab, "Optical Flow Based Moving Object Detection and Tracking for Traffic Surveillance", World Academy of Science, Engineering and Technology International Journal of Electrical, Robotics, Electronics and Communications Engineering, Vol. 7, No. 9, 2013.

In one or more embodiments as exemplified in FIG. 2, various simple filtering approaches may be used for the pre-filtering at 102', depending, e.g., on the noise of the incoming motion vectors.

A first approach may include a brute-force option, e.g., eliminating small vectors (considered noise).

For instance, in one or more embodiments, a vector $v=(dX, dY)$ may be considered small if $abs\_sum(v) <= MAX\_ABS\_VALUE$ (e.g., lower than a certain threshold), e.g., with $abs\_sum(v)=ABS(dX)+ABS(dY)$.

A second approach may include an option based on which small vectors are included which:

lie around a clustering of a previous frame;

have an orientation difference between the vector and the previous cluster frame is less than a threshold angle α.

A third approach may include both the option considered in the foregoing plus small vectors which are at least N in number, with the same orientation, in a certain window W×H.

In one or more embodiments the following numerical values may be used in the three approaches discussed in the foregoing:

first approach: MAX_ABS_VALUE=1;
second approach: α=[10° ... 50°] depending on the application;
third approach: W=8, H=8, N=5.

In one or more embodiments as exemplified in FIG. 2, the labelling process at 104 may be similar to the one disclosed, e.g., in M. Yokoyama and T. Poggio, "A Contour-Based Moving Object Detection and Tracking", Proceedings of the 14th International Conference on Computer Communications and Networks (ICCCN), 2005.

This may involve, e.g., inserting the same label to vectors v1 and v2 at position p1 and p2, if:

SAD(p1,p2)<MPD (see, e.g., M. Yokoyama and T. Poggio, "A Contour-Based Moving Object Detection and Tracking", Proceedings of the 14th International Conference on Computer Communications and Networks (ICCCN), 2005);

SAD(v1,v2)<MVD (this is a different condition if compared, e.g., to M. Yokoyama and T. Poggio, "A Contour-Based Moving Object Detection and Tracking", Proceedings of the 14th International Conference on Computer Communications and Networks (ICCCN), 2005, which considers the absolute difference of single components);

orientation_difference(v1,v2)<α (this is an additional condition if compared, e.g., to M. Yokoyama and T. Poggio, "A Contour-Based Moving Object Detection and Tracking", Proceedings of the 14th International Conference on Computer Communications and Networks (ICCCN), 2005).

In the foregoing SAD stands for Sum of Absolute Differences.

In one or more embodiments the following numerical values may be used:

MPD=[15 ... 75], MVD=[1 ... 5] depending on the application.

In one or more embodiments, the clustering step 106 may group into clusters vectors with a same label, while the clustering N×M step 108 may extend the clusters found to its N×M larger window.

In one or more embodiments as exemplified in FIG. 2, the merge clustering step 110 may merge two clusters C1 and C2 if:

((X_distance(C1,C2)<MCD) and (Y_distance(C1,C2)<MCD));
orientation_difference(C1,C2)<β.

As used herein cluster orientation denotes the average (mean) orientation of the vectors in the cluster.

In one or more embodiments the following numerical values may be used:

MCD=17; β=[10° ... 180°] depending on the application.

In one or more embodiments as exemplified in FIG. 2, temporal clustering at 112 may include:

obtaining a cluster relationship between previous and current frame clusters;
eliminating current clusters which have no relationship with a previous frame cluster;
merging previous and current cluster(s) "in relationship".

A cluster C1 from a previous frame and a cluster C2 in current frame may be held to be "in relationship" if, for example:

((X_distance(C1,C2)<MTCD) and (Y_distance(C1,C2)<MTCD));
orientation_difference(C1,C2)<β, which may be the same condition considered for merge clustering at 110.

In one or more embodiments, MTCD=1.

In one or more embodiments as exemplified in FIG. 2, cluster smoothing at 114 may involve calculating a weighted average between previous C1 and current C2 clusters "in relationship", e.g., as follows:

$$C2=(C2*CURRENT\_W+C1*PREVIOUS\_W)/SUM\_W.$$

In one or more embodiments the following numerical values may be used:

MTCD=1;
CURRENT_W=1; PREVIOUS_W=3; SUM_W=4.

In one or more embodiments as exemplified in FIG. 2, the temporal vector block 116 may correspond to inserting in a next frame all vectors contained in the current clusters (optionally applying the same movement, that is considering constant object speed).

In one or more embodiments, temporal clustering at 112 may lead to obtaining a cluster relationship between previous and current frame clusters.

This may facilitate, e.g., displaying the trajectory of an object (e.g., as identified with a same cluster number) in the scene, so that, e.g., the cluster centroid may be calculated and displayed.

Testing of exemplary embodiments performed with the Applicants in different scenarios and with different cameras C have demonstrated largely satisfactory visual results, e.g., by using:

linear and fish-eye lenses;
different cameras and resolutions;
different scenarios (with different parameters settings), e.g., for CTA (Control Traffic Alert) with both real and city simulation images, video surveillance, people detection and smart rear mirrors for motor vehicles.

For instance, in CTA city simulation, a system according to one or more embodiments was found to correctly identify two crossing cars.

Also, people detection procedures demonstrated the ability of correctly identifying a man leaving a bag and the bag itself with improved results over conventional people detection procedures.

A system according to one or more embodiments was experimented to correctly identify two men crossing, while conventional people detection procedures just identified only one.

Similarly, a system according to one or more embodiments in a real CTA scenario with fish-eye lens was found to be able to correctly identify three crossing cars.

One or more embodiments may thus provide a method of clustering image information conveyed by a stream of (e.g., digital) input frames (e.g., IF) starting from motion vectors (MV) for said input frames, the method including:

grouping (e.g., 104, 106, 108) said motion vectors into a set of clusters), applying merge clustering (110) to said set of clusters by merging clusters from said set of clusters, wherein the method may include one or more (and optionally all) of:

i) applying to said motion vectors, prior to said grouping into a set of clusters, filtering (e.g., 102') to remove small motion vectors not included in previous clusters (e.g., clusters for previous frames), ii) supplementing said merge clustering with temporal clustering (e.g., 112) by removing from said set of clusters those clusters which are not in a previous frame in said stream of input frames and joining those clusters for a current frame which refer to a same cluster for a previous frame in said stream of input frames, iii) calculating a weighed average (e.g., 114) of homologous clusters for a current frame and a previous frame in said stream of input frames), iv) supplementing said motion vectors for grouping in said set of clusters for a current frame with vectors (e.g., 116) resulting from said merge clustering (110, possibly supplemented by temporal clustering at, e.g., 112) for a previous frame in said stream of input frames.

In one or more embodiments, grouping said motion vectors into said set of clusters may be as a function of distance, module and angle difference between said motion vectors.

In one or more embodiments merging clusters from said set of clusters may be as a function of distance, module and angle difference between said clusters in said set of clusters.

In one or more embodiments, applying to said motion vectors said filtering to remove small motion vectors not included in previous clusters may include one of:

a) eliminating motion vectors having an absolute value (e.g., abs_sum(v)) not higher than a certain threshold (e.g., MAX_ABS_VALUE);

b) eliminating motion vectors other than those vectors lying around a cluster in a previous frame in said stream of input frames and having an orientation difference to said cluster in a previous frame in said stream of input frames (IF) less than a certain angle threshold (e.g., α);

c) eliminating motion vectors other than those vectors fulfilling condition b) above and other than those vectors that are at least a certain number N with a same orientation, in a certain frame window W×H.

In one or more embodiments, said temporal clustering (e.g., 112) may include:

obtaining a certain cluster relationship between frame clusters in a current frame and a previous frame in said stream of input frames, eliminating current frame clusters having no cluster relationship with a previous frame cluster, and merging previous and current frame clusters fulfilling said cluster relationship.

In one or more embodiments, a current frame cluster and a previous frame cluster may be held to fulfill said relationship when having a distance (e.g., X_distance (C1, C2) and Y_distance (C1, C2)) and an orientation difference (e.g., orientation_difference (C1, C2)) less than respective distance and orientation thresholds (e.g., MTCD, β).

One or more embodiments may include calculating a weighted average of homologous clusters for a current frame and a previous frame in said stream of input frames, wherein said homologous clusters fulfil said cluster relationship as defined previously for the purpose of said temporal clustering.

In one or more embodiments, said grouping of said motion vectors into a set of clusters may include grouping to a same cluster in said set of clusters vectors having a same label, by applying a same label to motion vectors v1 and v2 at positions p1 and p2, if:

i) SAD(p1,p2)<MPD and SAD(v1,v2)<MVD wherein SAD denotes Sum of Absolute Difference and MPD and MVD denote respective thresholds and ii) said motion vectors v1 and v2 have an orientation_difference less than certain angle threshold (e.g., α).

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
processing, using image processing circuitry, motion vectors associated with a current image frame in a stream of image frames, the processing including:
filtering the motion vectors associated with the current image frame;
grouping the filtered motion vectors associated with the current image frame into a set of clusters associated with the current image frame;
selectively merging clusters in the set of clusters associated with the current image frame;
calculating a weighted average of homologous clusters for the current image frame and a previous image frame in the stream of image frames; and
identifying one or more objects of interest in the stream of image frames based on the merged clusters associated with the current image frame, wherein the processing includes at least one of:
adding motion vectors included in merged clusters associated with a previous frame to filtered motion vectors before grouping the motion vectors in the current frame; and basing at least one of the grouping, the merging and filtering of the motion vectors associated with the current image frame on one or more clusters associated with one or more previous image frames in the stream of image frames.

2. The method of claim 1 wherein the filtering includes: comparing a magnitude of a motion vector associated with the current image frame to a threshold magnitude.

3. The method of claim 2 wherein the filtering comprises: selectively removing the motion vector from the motion vectors associated with the current image frame based on the comparison and on whether the motion vector is included in at least one cluster associated with a previous image frame.

4. The method of claim 3 wherein the filtering comprises removing the motion vector from the motion vectors associated with the current image frame when the magnitude is less than the threshold magnitude and the motion vector is not included in at least one cluster associated with the previous image frame.

5. The method of claim 2 wherein the filtering comprises:
retaining the motion vector in the motion vectors associated with the current image frame when the motion vector is within a threshold distance of a cluster associated with the previous image frame and an orientation difference between the motion vector and the cluster associated with the previous image frame is less than a threshold angle;
retaining the motion vector in the motion vectors associated with the current image frame when the motion vector is one of a number of motion vectors greater than a threshold number of motion vectors within a defined window frame and which have a same orientation;
retaining the motion vector in the motion vectors associated with the current image frame when the motion vector is included in at least one cluster associated with the previous image frame; and
otherwise removing the motion vector from the motion vectors associated with the current image frame when the comparison indicates the magnitude is less than the threshold magnitude.

6. The method of claim 1, comprising:
removing clusters from the set of clusters associated with the current image frame which are not included in a set of clusters associated with a previous image frame; and
merging two or more clusters associated with the current image frame which refer to a same cluster associated with the previous image frame.

7. The method of claim 1, comprising:
adding motion vectors included in merged clusters associated with a previous frame to the filtered motion vectors before grouping the motion vectors in the current frame.

8. The method of claim 1 wherein the grouping the motion vectors is based on at least one of distance, magnitude and angle differences between said motion vectors.

9. The method of claim 1 wherein the merging clusters from said set of clusters is based on at least one of distance, magnitude and angle differences between said clusters in said set of clusters.

10. The method of claim 1, comprising:
applying a same label to motion vectors v1 and v2 at positions p1 and p2, when:
i) SAD(p1,p2)<MPD and SAD(v1,v2)<MVD
wherein SAD denotes Sum of Absolute Difference and MPD and MVD denote respective thresholds; and ii) said motion vectors v1 and v2 have an orientation difference less than a threshold angle; and
grouping motion vectors having a same label into a cluster.

11. The method of claim 1, comprising using an identified object of interest to perform one or more of:
camera surveillance;
object recognition;
object tracking;
people detection;
face recognition;
cross-traffic monitoring;
behavioral analysis;
unattended luggage detection.

12. A method, comprising:
processing, using image processing circuitry, motion vectors associated with a current image frame in a stream of image frames, the processing including:
filtering the motion vectors associated with the current image frame;
grouping motion vectors associated with the current image frame into a set of clusters associated with the current image frame;
selectively merging clusters in the set of clusters associated with the current image frame; and
identifying one or more objects of interest in the stream of image frames based on the merged clusters associated with the current image frame, wherein the processing includes at least one of:
adding motion vectors included in merged clusters associated with a previous frame to filtered motion vectors before grouping the motion vectors in the current frame; and
basing at least one of the grouping, the merging and filtering of the motion vectors associated with the current image frame on one or more clusters associated with one or more previous image frames in the stream of image frames, wherein the method comprises:
determining whether a relationship criteria is satisfied between a cluster associated with the current image frame and at least one cluster associated with a previous image frame;
when it is determined that the relationship criteria is not satisfied for at least one cluster associated with the previous image frame, removing the cluster associated with the current image frame from the set of clusters associated with the current image frame; and
when it is determined that the relationship criteria is satisfied for a cluster associated with the previous image frame, merging the cluster associated with the current image frame and the cluster associated with the previous image frame in the set of clusters associated with the current image frame.

13. The method of claim 12, comprising determining the relationship criteria is satisfied when:
a distance between the cluster associated with the current image frame and a cluster associated with the previous image frame is less than a threshold distance; and
a difference in orientation between the cluster associated with the current image frame and the cluster associated with the previous image frame is less than a threshold angle.

14. The method of claim 12, comprising:
calculating a weighted average of homologous clusters for the current image frame and a previous image frame in the stream of image frames.

15. The method of claim 14 wherein said homologous clusters satisfy the relationship criteria with each other.

16. A device, comprising:
one or more memories; and
image processing circuitry coupled to the one or more memories, and which, in operation,
processes motion vectors associated with a current image frame in a stream of image frames, the processing including:
filtering motion vectors associated with a current image frame in a sequence of image frames;
grouping the filtered motion vectors associated with the current image frame of the stream of image frames into a set of clusters associated with the current image frame;
selectively merging clusters in the set of clusters associated with the current image frame;
calculating a weighted average of homologous clusters for the current image frame and a previous image frame in the stream of images; and
identifying one or more objects of interest in the stream of image frames based on the merged clusters associated with the current image frame, wherein the processing includes at least one of:
basing at least one of the grouping, the merging and filtering of motion vectors associated with the current image frame on one or more clusters associated with one or more previous image frames in the stream of image frames; and
adding motion vectors included in merged clusters associated with a previous frame to filtered motion vectors before grouping the motion vectors in the current frame.

17. The device of claim 16 wherein the filtering includes: comparing a magnitude of a motion vector associated with the current image frame to a threshold magnitude.

18. The device of claim 17 wherein the image processing circuitry, in operation, selectively removes the motion vector from the motion vectors associated with the current image frame based on the comparison and on whether the motion vector is included in at least one cluster associated with a previous image frame.

19. The device of claim 18 wherein the image processing circuitry, in operation, removes the motion vector from the motion vectors associated with the current image frame when the magnitude is less than the threshold magnitude and the motion vector is not included in at least one cluster associated with the previous image frame.

20. The device of claim 18 wherein the image processing circuitry, in operation:
retains the motion vector in the motion vectors associated with the current image frame when the motion vector is within a threshold distance of a cluster associated with the previous image frame and an orientation difference between the motion vector and the cluster associated with the previous image frame is less than a threshold angle;
retains the motion vector in the motion vectors associated with the current image frame when the motion vector is one of a number of motion vectors greater than a threshold number of motion vectors within a defined window frame and which have a same orientation;
retains the motion vector in the motion vectors associated with the current image frame when the motion vector is included in at least one cluster associated with the previous image frame; and
otherwise removes the motion vector from the motion vectors associated with the current image frame when the comparison indicates the magnitude is less than the threshold magnitude.

21. The device of claim 16 wherein the image processing circuitry, in operation:
removes clusters from the set of clusters associated with the current image frame which are not included in a set of clusters associated with a previous image frame; and
merges two or more clusters associated with the current image frame which refer to a same cluster associated with the previous image frame.

22. The device of claim 16 wherein the image processing circuitry, in operation:
adds motion vectors included in merged clusters associated with a previous frame to the motion vectors before grouping the motion vectors in the current image frame.

23. The device of claim 16 wherein the image processing circuitry uses an identified object of interest to perform one or more of:
camera surveillance;
object recognition;
object tracking;
people detection;
face recognition;
cross-traffic monitoring;
behavioral analysis;
unattended luggage detection.

24. A device, comprising:
one or more memories; and
image processing circuitry coupled to the one or more memories, and which, in operation,
processes motion vectors associated with a current image frame in a stream of image frames, the processing including:
filtering motion vectors associated with a current image frame in a sequence of image frames;
grouping the filtered motion vectors associated with the current image frame of the stream of image frames into a set of clusters associated with the current image frame;
selectively merging clusters in the set of clusters associated with the current image frame; and
identifying one or more objects of interest in the stream of image frames based on the merged clusters associated with the current image frame, wherein the processing includes at least one of:
basing at least one of the grouping, the merging and filtering of motion vectors associated with the current image frame on one or more clusters associated with one or more previous image frames in the stream of image frames; and
adding motion vectors included in merged clusters associated with a previous frame to filtered motion vectors before grouping the motion vectors in the current frame, and the image processing circuitry, in operation:
determines whether a relationship criteria is satisfied between a cluster associated with the current image frame and at least one cluster associated with a previous image frame;
when it is determined that the relationship criteria is not satisfied for at least one cluster associated with the previous image frame, removes the cluster associated with the current image frame from the set of clusters associated with the current image frame; and when it is determined that the relationship criteria is satisfied for a cluster associated with the previous image frame, merges the cluster associated with the current image frame and the cluster associated with the previous image frame in the set of clusters associated with the current image frame.

25. The device of claim 24, wherein the image processing circuitry determines the relationship criteria is satisfied when:
a distance between the cluster associated with the current image frame and a cluster associated with the previous image frame is less than a threshold distance; and
a difference in orientation between the cluster associated with the current image frame and the cluster associated with the previous image frame is less than a threshold angle.

26. A system, comprising:
an image capture device to capture a stream of image frames; and
image processing circuitry coupled to the image capture device, and which, in operation,
filters motion vectors associated with a current image frame in the sequence of image frames;
groups the filtered motion vectors associated with the current image frame into a set of clusters associated with the current image frame;
selectively merges clusters in the set of clusters associated with the current image frame;
calculates a weighted average of homologous clusters for the current image frame and a previous image frame in the sequence of image frames, wherein at least one of the filtering, the grouping and the merging is based on one or more clusters associated with one or more previous image frames in the sequence of image frames; and
identifies one or more objects of interest in the sequence of image frames based on the merged clusters associated with the current image frame.

27. The system of claim 26 wherein the filtering the motion vectors associated with the current image frame comprises:
comparing a magnitude of a motion vector associated with the current image frame to a threshold magnitude; and
selectively removing the motion vector from the motion vectors associated with the current image frame based on the comparison and on whether the motion vector is included in at least one cluster associated with a previous image frame.

28. The system of claim 27 wherein the image processing circuitry, in operation:
retains the motion vector in the motion vectors associated with the current image frame when the motion vector is within a threshold distance of a cluster associated with the previous image frame and an orientation difference between the motion vector and the cluster associated with the previous image frame is less than a threshold angle;
retains the motion vector in the motion vectors associated with the current image frame when the motion vector is one of a number of motion vectors greater than a threshold number of motion vectors within a defined window frame and which have a same orientation;
retains the motion vector in the motion vectors associated with the current image frame when the motion vector is included in at least one cluster associated with the previous image frame; and
otherwise removes the motion vector from the motion vectors associated with the current image frame when the comparison indicates the magnitude is less than the threshold magnitude.

29. The system of claim 26 wherein the image processing circuitry, in operation:
removes clusters from the set of clusters associated with the current image frame which are not included in a set of clusters associated with a previous image frame; and
merges two or more clusters associated with the current image frame which refer to a same cluster associated with the previous image frame.

30. The system of claim 26 wherein the image processing circuitry, in operation:
determines whether a relationship criteria is satisfied between a cluster associated with the current image frame and at least one cluster associated with a previous image frame;
when it is determined that the relationship criteria is not satisfied for at least one cluster associated with the previous image frame, removes the cluster associated with the current image frame from the set of clusters associated with the current image frame; and
when it is determined that the relationship criteria is satisfied for a cluster associated with the previous image frame, merges the cluster associated with the current image frame and the cluster associated with the previous image frame in the set of clusters associated with the current image frame.

31. The system of claim 26 wherein the image processing circuitry, in operation:
adds motion vectors included in merged clusters associated with a previous frame to the filtered motion vectors before grouping the motion vectors in the current image frame.

32. The system of claim 26 wherein the image processing circuitry uses an identified object of interest to perform one or more of:
camera surveillance;
object recognition;
object tracking;
people detection;
face recognition;
cross-traffic monitoring;
behavioral analysis;
unattended luggage detection.

33. A non-transitory computer-readable medium having contents which configure image processing circuitry to perform a method, the method comprising:
filtering motion vectors associated with a current image frame in the image sequence;
grouping the filtered motion vectors associated with the current image frame into a set of clusters associated with the current image frame;
selectively merging clusters in the set of clusters associated with the current image frame;
calculating a weighted average of homologous clusters for the current image frame and a previous image frame in the image sequence; and
identifying one or more objects of interest in the image sequence based on the merged cluster associated with the current image frame, wherein the method comprises at least one of:
basing at least one of the filtering, the grouping and the merging on one or more clusters associated with one or more previous image frames in the image sequence; and adding motion vectors included in merged clusters associated with a previous frame to the filtered motion vectors before grouping the motion vectors in the current frame.

34. The non-transitory computer-readable medium system of claim 33 wherein the filtering the motion vectors associated with the current image frame comprises:

comparing a magnitude of a motion vector associated with the current image frame to a threshold magnitude; and selectively removing the motion vector from the motion vectors associated with the current image frame based on the comparison and on whether the motion vector is included in at least one cluster associated with a previous image frame.

35. The non-transitory computer-readable medium of claim 33 wherein the method comprises:

removing clusters from the set of clusters associated with the current image frame which are not included in a set of clusters associated with a previous image frame; and merging two or more clusters associated with the current image frame which refer to a same cluster associated with the previous image frame.

36. The non-transitory computer-readable medium of claim 33 wherein the method comprises:

determining whether a relationship criteria is satisfied between a cluster associated with the current image frame and at least one cluster associated with a previous image frame;

when it is determined that the relationship criteria is not satisfied for at least one cluster associated with the previous image frame, removing the cluster associated with the current image frame from the set of clusters associated with the current image frame; and when it is determined that the relationship criteria is satisfied for a cluster associated with the previous image frame, merging the cluster associated with the current image frame and the cluster associated with the previous image frame in the set of clusters associated with the current image frame.

37. The non-transitory computer-readable medium of claim 33 wherein the method comprises:

adding motion vectors included in merged clusters associated with a previous frame to the filtered motion vectors before grouping the motion vectors in the current image frame.

38. The non-transitory computer-readable medium of claim 33 wherein the method comprises using an identified object of interest to perform one or more of:

camera surveillance;
object recognition;
object tracking;
people detection;
face recognition;
cross-traffic monitoring;
behavioral analysis;
unattended luggage detection.

* * * * *